W. D. BEYMER.
BILLING FORM.
APPLICATION FILED MAY 3, 1918.

1,335,420.

Patented Mar. 30, 1920.
4 SHEETS—SHEET 1.

W. D. BEYMER.
BILLING FORM.
APPLICATION FILED MAY 3, 1918.
1,335,420.
Patented Mar. 30, 1920.
4 SHEETS—SHEET 2.
Fig. 3.
DOE&COE CENTRAL R.R.
MEMORANDUM OF SHIPMENT
STATION AND DATE
| COMMODITY | WEIGHT | CAR INITIAL AND NUMBER | FREIGHT BILL NUMBER | SHIPPER AND POINT OF SHIPMENT | CONSIGNEE AND DESTINATION | | TOTAL TO COLLECT |
|---|---|---|---|---|---|---|---|
| $g^2$ | $h^2$ | $i^2$ | $j^2$ | $k^2$ | $l^2$ | | $m^2$ |
| 10 | 11 | 12 | 13 | 14 | 15 | | 16 |
Fig. 4.
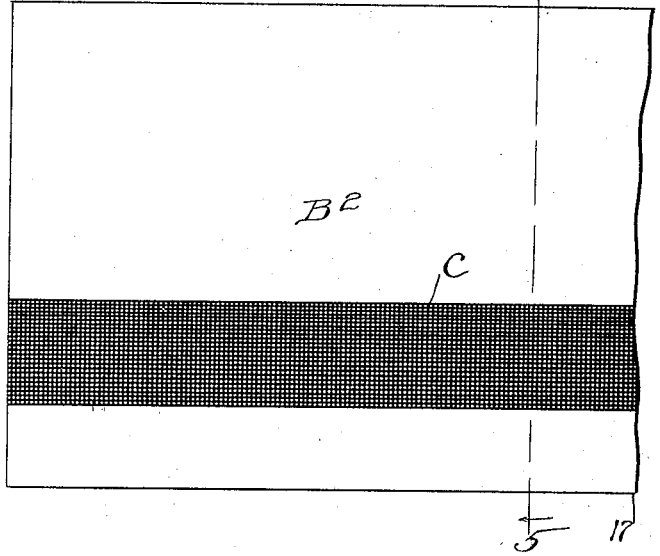
Fig. 5.
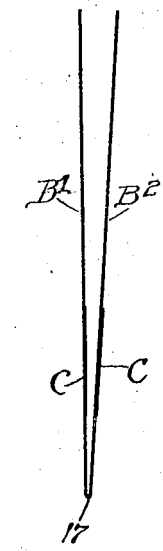
Witness:
Harry S. Gaither
Inventor:
Walter D. Beymer
by  Brown
Atty.

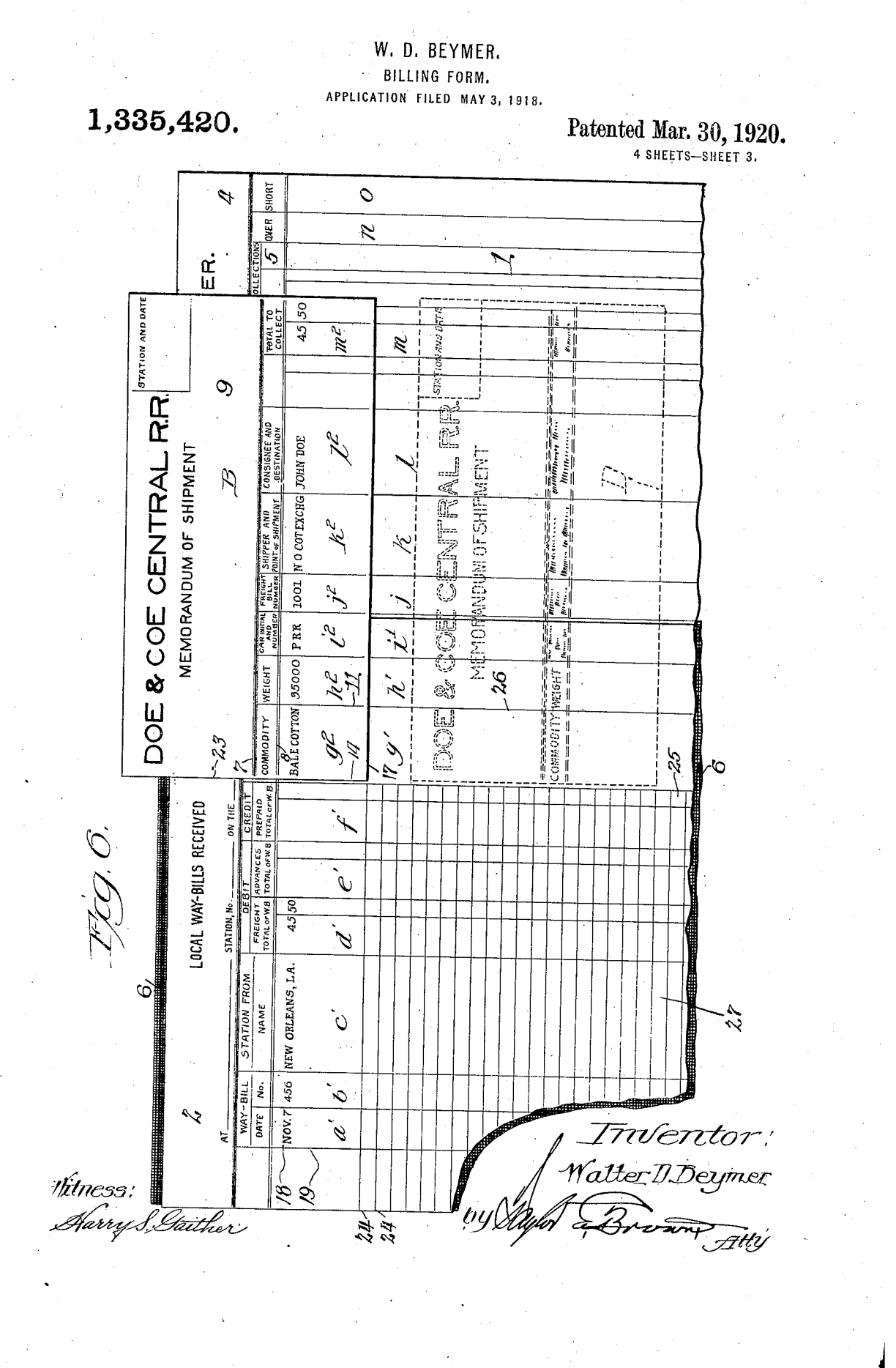

W. D. BEYMER.
BILLING FORM.
APPLICATION FILED MAY 3, 1918.

1,335,420.

Patented Mar. 30, 1920.
4 SHEETS—SHEET 3.

Fig. 6.

Witness:
Harry S. Gaither

Inventor:
Walter D. Beymer
by [signature], Atty

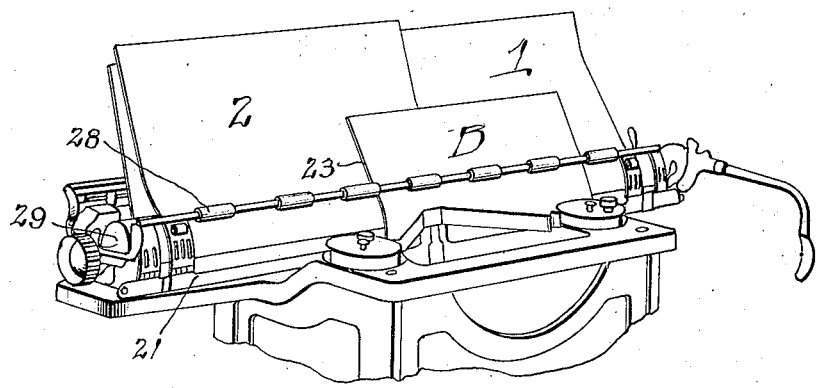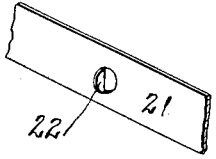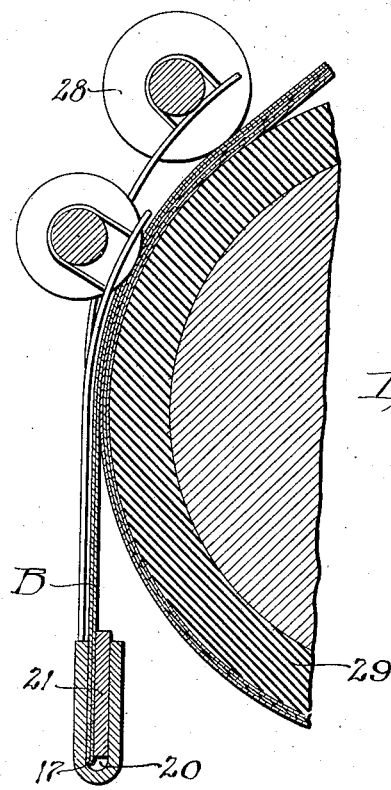

UNITED STATES PATENT OFFICE.

WALTER D. BEYMER, OF CHICAGO, ILLINOIS.

BILLING-FORM.

1,335,420.  Specification of Letters Patent.  Patented Mar. 30, 1920.

Application filed May 3, 1918. Serial No. 232,388.

*To all whom it may concern:*

Be it known that I, WALTER D. BEYMER, a citizen of the United States, and a resident of Chicago, in the county of Cook and State of Illinois, have invented certain new and useful Improvements in Billing-Forms; and I do hereby declare that the following is a full, clear, and exact description thereof, reference being had to the accompanying drawings, and to the letters of reference marked thereon, which form a part of this specification.

This invention relates to a novel arrangement of forms for use in freight offices of railroads, for listing the necessary data with respect to freight received.

One of the principal objects of my invention is the production of a set of forms whereby great economy of time is effected in the making out of a register of shipments from the waybills received, for permanent record in the freight department, also in the making of an abstract of such register for use in the general offices of the railroad company, and also for the making of a freight bill and memorandum of shipment to the consignee; and in so arranging these several forms that all of the data and record of each individual shipment will be made simultaneously.

Shipments of freight are listed on waybills made out at the point of shipment. When received at destination or at a forwarding freight yard, these shipments are recorded from said waybills on a relatively large sheet, usually (and herein) called a register. These sheets are commonly handled in typewriting machines having a carriage of the necessary length to receive the said relatively wide register sheet, which latter when filled with the data concerning a plurality of shipments, becomes one sheet of a permanent record or book in the freight office. A smaller sheet, but of the same length, usually called an abstract, is made out for permanent use in the general offices of the railroad. It contains a duplicate of the same shipments in number as are entered on the register sheet, but not with the same detail—containing only the data pertinent to the requirements of the general office, and omitting some of the data peculiarly pertinent to the freight office.

For example, the register may contain columns wherein may be entered the cash transactions of the freight office, &c., thus becoming a daily blotter or cash book, and which items are not required to be reported daily in this form to the general offices.

It is customary, also, to notify the consignee of the arrival of the shipment to him with certain data with respect thereto and with a bill or memoranda of the amount of the freight charges due. Each freight bill or memorandum of shipment will relate to a single shipment; and if there be more than one shipment to the same consignee, received on the same day and entered on the register and the abstract of that date, separate freight bills or memorandum of shipment will be made out for each such shipment.

The freight bill or memoranda of shipment therefore, will, preferably, be a relatively small form or sheet.

One of the objects of my invention, therefore, is such an arrangement of the three forms mentioned *i. e.*, the register, the abstract and the freight bill, as will not only permit the data respecting a given shipment to be entered upon the three forms simultaneously, but which will permit of the insertion in the typewriting machine, without removing therefrom the register and abstract sheets, of a second freight bill after the first freight bill has been written upon and withdrawn from the machine. That is to say, if, for example, there are to be twenty shipments recorded upon the twenty lines of the register and abstract sheets, such entries will be made without removing said sheets from the machine and by simply shifting them therein in a familiar manner by turning the platen of the machine to bring the next lower writing space in line with the point of printing contact with the type; and the entries on the twenty freight bills will be made by inserting each one of the twenty freight bill sheets in the machine in superposed position over the writing space of the register and abstract of its own shipment,—the freight bill sheet for the preceding entry having first been withdrawn.

Another object of my invention is a set of blank forms comprising a register sheet and an abstract sheet, each adapted to receive records of a plurality of shipments, and a plurality of smaller freight bill or memorandum of shipment sheets, each adapted to receive the record of one of said shipments only, each of said sheets being provided with appropriate writing spaces and columns for the entry of the desired data and so arranged that the freight bill or memorandum of shipment sheet may be used with one or both of the abstract or register sheets and when superposed thereon, will have its columns and writing spaces in proper vertical and transverse relation to the corresponding columns and writing spaces of the subjacent sheet or sheets.

These and other objects of my invention will be manifest as I proceed with my description of that embodiment of my invention herein shown, in which I have chosen to illustrate the same.

Referring to the accompanying drawings:

Figure 1 illustrates in a plan view, the register sheet to the left hand margin of which is detachably connected the abstract sheet, the reverse face of the latter being shown.

Fig. 2 is a plan view of the register and abstract sheets, the latter having been folded over the former to show the front face of the abstract sheet.

Fig. 3 is a plan view showing the face of the freight-bill or memorandum of shipment.

Fig. 4 is a plan view showing the reverse face of the freight bill sheet with a strip of carbon or other transfer medium extending across the sheet near its lower margin.

Fig. 5 is a vertical sectional view of the freight bill sheet taken on the line 5—5 of Fig. 4.

Fig. 6 is a plan view showing the relative positions of the register, the abstract and the freight bill sheets when in superposed relation, and with a record of one shipment written thereon.

Fig. 7 is a perspective view of a typewriting machine, illustrating the manner of using the register, abstract and freight bill sheets.

Fig. 8 is a transverse, vertical, sectional view of a portion of a typewriting machine showing the relation of the freight bill to the mechanism of the machine.

Fig. 9 is a detail view of a part of the typewriting machine showing a guide stop or shoulder against which the edge of the freight bill rests when in place in the machine.

I will first describe the register and abstract sheets, which I have identified in the drawing by the letter A. It will be noticed by reference to Fig. 1, that the sheet A has two members, the register 1 and the abstract 2, removably joined together by dotted or weakened lines 3. The register 1 has horizontally ruled lines on its upper portion, affording spaces 4, 5 for the printing of the necessary forms, designations and instructions required, all spaced above the appropriate columns $a$, $b$, $c$, $d$, $e$, $f$, $g$, $h$, $i$, $j$, $k$, $l$, $m$, $n$, $o$, defined in the usual manner by vertically arranged lines or ruling, as shown. There may be horizontally arranged writing lines extending across these columns, but where the entries are made upon a typewriting machine, such horizontal lines are not required and I have not shown them in the drawing, for this reason.

It will be observed that there is no writing or printed form on the obverse side of the abstract sheet 2 (see Fig. 1) and that the reverse face of this sheet 2 is so ruled and spaced that when the abstract is folded on the line 3 and superposed upon the adjacent portion of the register (see Fig. 2), the spaces $a'$, $b'$, $c'$, $d'$, $e'$, $f'$, $g'$, $h'$, $i'$, thereon, will accurately register with the subjacent corresponding spaces, $a$, $b$, $c$, $d$, $e$, $f$, $g$, $h$, $i$, respectively, of the register. Thus, when a carbon sheet or other transferring ribbon or medium, indicated at 6, is placed between the sheets 1 and 2, all writing made upon the abstract sheet 2 will be offset and duplicated in its proper space on the register sheet 1.

Referring now to Figs. 3, 4 and 5, I will describe the freight bill and memorandum of shipment B, which is in two sections $B^1$, $B^2$ joined at their lower edges 17. On the writing face of each section are horizontally ruled lines 7, 8, between which will be printed the form and designations required, and above which, in the space 9, will be printed the name of the railroad and other desired advertising matter or information to the consignee. Vertical lines or rulings 10, 11, 12, 13, 14, 15 and 16, divide the lower portion of the freight bill B into appropriate spaces or columns $g^2$, $h^2$, $i^2$, $j^2$, $k^2$, $l^2$, and $m^2$, as shown. In these columns or spaces will be entered the same data as is required for the corresponding spaces, $g$ and $g'$, $h$ and $h'$, $i$ and $i'$, of the register sheets, respectively.

Across the reverse side of the freight bill B is a strip of carbon or other transfer medium C. This transfer medium is located as shown, near the lower edge 17 of each section $B^1$, $B^2$. Its width and its position on the back of the section of sheet is such that when the freight bill B is superposed above the register and abstract, in the manner indicated in Fig. 6, this carbonized portion C, C, will be directly above and in juxtaposition to the horizontal writing line upon which the entry is to be made, not only upon the abstract but upon the register. When the sheet B is superposed upon the register and abstract sheet A, and writing is made upon the sheet $B^1$, the strip of carbon on its back will, in a familiar manner, offset upon the inside face of the part $B^2$ of the sheet B and duplicate this writing. Similarly and simultaneously the carbon strip on the back of the sheet B² will offset and reproduce this writing upon the top face of the sheet A in its appropriate line and columns.

By reference to Fig. 5 it will be noted that the freight bill is in duplicate, the two parts being joined along the lower margin 17 which margin 17 may be defined by a series of perforations or a weakened line in a familiar manner, so that the two sections B¹ and B² of the freight bill may be separated from each other, on said weakened line or margin 17.

By reference to Fig. 7, it will be noted that the register 1 and the abstract 2, having first been folded in the position indicated in Fig. 2, are placed in the typewriting machine in the customary way at the back of the platen and rolled around until the upper edge projects up in front of the platen with the first writing line indicated in Fig. 6 by the numeral 18 in position to receive the printing from the type of the machine, in the usual way. Either an inter-leaved sheet of carbon, indicated at 6, or the ribbon or other transfer medium used in the typewriter, will first be inserted between the back of the abstract 2 and the face of the register 1, and covering all that portion of the register sheet 1 that lies directly beneath the abstract 2.

Then the folded memorandum of shipment or freight bill B is placed in the machine, the edge 17 thereof, downwardly, in a position in front of the platen and superposed on that part of the abstract containing the writing spaces $g'$, $h'$, $i'$, and that part of the register, covering the writing spaces $j$, $k$, $l$, $m$. The sheet B is inserted in the machine until it is in the relative position with respect to the abstract and register, indicated in Fig. 6; that is to say, the columns and spaces indicated being in alinement, both vertically and horizontally.

Then the line of writing indicated at 18 is commenced, the typewriter being used in the ordinary fashion, the carriage moved from right to left, so that there will be inserted the following record on said line 18, in proper spaces, to-wit: Date of Waybill, "Nov. 7", No. of Waybill, "456", Name of the station from which shipment was made, "New Orleans, La.", Total debit of freight shown on waybill, "$45.50," commodity "Baled cotton," Weight "35,000," Car initial, "P R R," Freight bill No. "1001," Shipper, "N. O. Cot. Exch.", Consignee "John Doe," Total to collect, "$45.50."

The platen of the machine is then turned, the abstract, register and freight bill moved the proper distance, usually about one-sixth of an inch or the width of a writing line, ready to receive the memoranda for the next shipment, on the writing line space indicated 19, immediately below the line writing indicated at 18. This movement will sufficiently release the freight bill B so that it may be quickly withdrawn from the machine and a second freight bill inserted in its place. When this second bill is thus inserted, it will be found that the carbon strip or transfer medium C on the reverse side thereof, will be in proper position to offset the writing upon the subjacent spaces in the appropriate line, to-wit: line 19, and so on, the operation may be repeated, until the entire spaces of the abstract and register have been filled with the necessary entries.

By referring to Figs. 7, 8 and 9, of the drawing, it will be noted that a groove or recess 20 is formed in a suitable member attached to the carriage 21 of the machine, the groove extending lengthwise of the carriage. In this groove or recess, the lower edge 17 of the bill sheet B is received and supported. Any form of recess or groove may be used, the one consideration being that its location shall be such, with reference to the horizontal writing line in the plane of the printing point of the type bars, as to bring the carbonized portion or strip C on the reverse side of the freight bill B, in proper superposed relation to said writing space or line. At an appropriate place on the carriage of the typewriter machine, a suitable stop bar 22 is positioned, against which the left hand margin 23 of the freight bill B will abut, when said bill is placed in the machine. Thus the operator will have no difficulty in very quickly inserting the freight bill B in the machine, and by jogging the same to the left against the stop 22 until the vertical edge 23 rests against said stop and pushing said bill downwardly into the machine until the lower margin 17 rests firmly in said groove 20. The operator will then know that the bill sheet B is in proper superposed relation with respect to the abstract and register sheets,—as indicated in Fig. 6.

Where the bill sheet B, the abstract and register sheets are used, other than in a typewriter, as for example on a writing desk, the operator will have no difficulty in properly spacing and positioning the freight bill B, in the proper superposed relation shown in Fig. 6, and holding the same in said relation while he makes the entry.

This may be accomplished by providing the abstract sheet 2 with other means for adjusting the freight bill or memoranda of shipment B, by means of its lower edge 17,—such, for example, as a plurality of horizontally arranged lines 24, 24, as shown in Fig. 6. These lines 24, 24, are spaced apart the width of one writing space; the topmost of the lines 24, as shown in Fig. 6, being at such distance below the top of the abstract 2 and register 1, as to provide a proper place for the first entry in the uppermost writing space or line 18. By moving the second memorandum of shipment sheet B, after the first one has been written upon and removed, into superposed relation upon the register 1 and abstract 2, so that the lower edge 17 of said second sheet will be upon the next subjacent or second line 24, it will be found that the entry of the second shipment upon the register and abstract will be in the writing space or line 19 immediately below the line 18 of the first entry and in the appropriate columns.

Means for adjusting the sheet B upon the abstract and register, so that its various columns $g^2$, $h^2$, $i^2$, etc. shall be in vertical registration with the columns $g'$, $h'$, $i'$, respectively, is provided by a vertical guide or ruling 25 on the abstract sheet 2 with which the edges 23 of the sheet B may register, or for example a vertical line or rule 26 may be placed on the abstract to register with the line 11 of the sheet B. Other suitable means for registering the sheet B both vertically and horizontally may obviously be employed.

Thus, as each succeeding sheet B is placed in proper superposed position upon the abstract and register sheets, the desired entries will be made upon said newly applied sheets B, B, at or near the top of the appropriate column and in a horizontal line, while the entry of the same shipment will be made upon the abstract and register sheets, on the next succeeding line below that on which the preceding entry was made. For example, by dotted lines D in Fig. 6, I have indicated the memorandum of shipment sheet B when its lower edge 17 is in horizontal alinement with that one of the guide lines indicated at 27.

It will be found convenient in using these forms in a typewriting machine, to have a presser bar 28 extending in front of the platen 29, and designed, with sufficient pressure, to hold the upper portion of the freight bill B against the platen; but as this device and the guide 21 and the shoulder 22 form no part of the present invention, and are only herein shown for purposes of illustrating the method of using the embodiment of the invention herein shown, further description of the details of the same and of the writing machine are unnecessary, and therefore omitted.

It is not necessary to use the same columns and spaces herein illustrated for the "printed forms" as many railroads have special requirements and all do not use the same printed form data. Nor is it always required to use the smaller memorandum of shipment sheet with both the register and abstract sheets. For example, in transferring a given shipment at a junction or forwarding point, not to a consignee but to a connecting or forwarding railroad,—while it is required to record that fact, it is not necessary to do so upon both sheets, but only upon the register or the abstract sheet as may be desired by the particular user. Again, the memorandum of shipment sheet so used would have, preferably, printed form data in its appropriate spaces different from that shown in Fig. 6,—such, for instance, as "cash" item. These and other modifications will readily occur to users, all of which I desire to have included and comprehended within the scope of my invention.

With hundreds of individual transactions to be handled daily, the saving of time in making the abstract, the register and the memorandum of shipment or freight bill of each particular shipment, simultaneously, is of immense importance and is a matter of easy accomplishment with the arrangement herein shown and described.

I claim as my invention:

1. A set of freight office forms comprising a register sheet spaced on its face to receive a record of necessary data relating to a plurality of freight shipments, an abstract sheet removably secured to the register sheet and spaced on its back to receive a record of a portion only of said data relating to the same shipments, when folded over the register sheet, a transfer medium between said folded sheets, a separate freight bill sheet spaced on its face to receive a record of only one shipment, and a transfer medium on the back of the freight bill form, whereby one writing will record the appropriate entries upon all three sheets.

2. A set of blank freight office forms, comprising a register sheet spaced on its face with columns for recording necessary data and of a length to receive entries in said columns relating to a plurality of separate shipments, and an abstract sheet removably secured to the register sheet and of equal length but of lesser width, spaced columns on the back of said abstract sheet adapted to register with corresponding columns of the register sheet when superposed thereon and for the recording of a portion only of the data relating to a given shipment entered on the register sheet combined with a separate freight bill sheet spaced for the recording of a portion of the data of a single shipment entered on the register and abstract sheets, when superposed thereupon.

3. A set of blank freight office forms, comprising a register sheet spaced to receive the record of necessary data relating to a plurality of freight shipments, an abstract form detachably connected with the register sheet and spaced to receive the record of a portion only of said data relating to the same shipments and a separate freight bill sheet spaced to receive the record of a portion only of said data for one shipment only, the abstract and the register sheets being of the same length and the freight bill sheet being relatively shorter than the abstract and register sheets.

4. A set of blank freight office forms, comprising a register sheet spaced laterally to receive the record of necessary data relating to a single transaction or freight shipment, and of a length to receive the record relating to a plurality of shipments, an abstract sheet detachably connected to and of the same length as the register sheet but of a width to receive the record of a portion only of said data relating to a single shipment, a separate freight bill sheet spaced to receive the record of a portion only of said data for one shipment only, said freight bill sheet being provided on its reverse side with a horizontally disposed relatively narrow strip of carbon or transfer medium.

5. The combination with a sheet of paper in two parts detachably connected, one part being provided with lines to form columns for entering data relating to a single shipment and of such length as to receive similar data relating to a plurality of shipments, the other portion of the sheet being similarly provided on its reverse side with columns of a length to receive the record of the same number of transactions, said columns being fewer in number to receive the record of only a portion of the data of a single shipment, of a sheet of carbon or transfer medium between said parts when folded in superposed relation, a separate and relatively narrow freight bill sheet spaced to register with a portion of the columns of both parts of said sheet of paper and a narrow strip of carbon or transfer medium on the back of the freight bill sheet.

6. A set of printed forms comprising a large register sheet, a narrower abstract sheet of the same length as the register sheet, removably attached to the register sheet, both ruled and spaced to receive the record of a plurality of transactions, a transfer medium between said sheets when folded together, and two freight bill sheets, each narrower and shorter than the register and abstract sheets and ruled and spaced to receive only a portion of the record relating to a single transaction, said freight bill sheets being folded and removably secured together at their bottom edge and each having on its reverse side near the fold, a narrow strip of carbon or transfer material, the printed forms and writing spaces of the register, abstract and bill sheets being arranged to register with each other when in superposed operative relation.

7. A set of printed forms comprising a large register sheet adapted for use in an ordinary typewriting machine, a narrower abstract sheet of the same length as and detachably secured to the register sheet, means for transferring writing on the abstract to the subjacent register sheet when the two are in superposed relation, duplicate freight bill sheets detachably secured together at their bottom edge, each containing printed forms adapted to register with each other and with part of the columns on the abstract sheet, and with part of the columns on the abstract and register sheet, a narrow strip of carbon or transferring material on the reverse side of each freight bill sheet near said folded bottom edge, said register, abstract and freight bill sheets being adapted to be clamped or held together in such position that after a written record is made upon one and the same horizontal line of each of said sheets, the freight bills may be removed and another set of freight bills inserted in exact horizontal alinement with the next succeeding writing space.

8. A set of freight office forms comprising a register sheet adapted for recording the necessary data relating to a plurality of freight shipments, an abstract form detachably united to the register sheet and spaced with columns adapted for the recording of a portion only of said data relating to the same shipments, a separate duplicate freight bill form having relatively small writing space adapted for the recording only of the data for one shipment, and means for adjusting the freight bill form in superposed relation upon the abstract and register forms.

9. A set of freight office forms, comprising a register sheet adapted for recording the necessary data relating to a plurality of freight shipments, an abstract form detachably united to the register sheet and spaced with columns adapted for the recording of a portion only of said data relating to the same shipments, a separate duplicate freight bill form having a relativly narrow writing space adapted for the recording of a portion only of the data for one shipment and means for adjusting the freight bill form in superposed relation upon and to cover only a portion of the register and of the abstract forms, said means comprising a horizontally arranged guide adapted to indicate the position of the lower edge of the freight bill form.

10. A set of freight office forms comprising a register sheet adapted for recording the necessary data relating to a plurality of freight shipments, an abstract form detachably united to the register sheet and spaced with vertical columns adapted for the recording of a portion only of the said data relating to the same shipments, a separate duplicate freight bill form having a relatively narrow writing space adapted for the recording of a portion only of the data for one shipment, and means for adjusting the freight bill form in superposed relation upon and to cover a portion only of the register and abstract forms, said means comprising a guide adapted to register with the vertical side margin of the freight bill.

11. A set of freight office forms comprising a register sheet adapted for the recording of necessary data relating to a plurality of freight shipments, an abstract form detachably united to the register sheet and adapted for recording of a portion only of said data relating to the same shipment, a separate duplicate freight bill form adapted for the recording of a portion only of said data relating to one shipment only, means coöperating with the lower edge of the freight bill form and means coöperating with the side edge of the freight bill form whereby horizontal and vertical alinement of the freight bill form will be effected in its superposed relation upon the abstract form and the register sheet.

12. A set of freight bill forms comprising a register sheet and an abstract sheet, each having writing spaces and columns for the entry of appropriate data, said sheets being removably joined together, said writing spaces and columns of the abstract sheet being formed upon the back thereof so as to register with corresponding spaces and columns of the register sheet when the abstract is superposed thereon by folding, means between the two when folded for duplicating upon the register sheet the record made by writing upon the abstract, a duplicate memorandum of shipment sheet, the two parts of which are joined at their lower edges, writing spaces and columns on each sheet corresponding with certain writing spaces and columns of the register and the abstract sheets, means on the back of each memorandum of shipment sheet for reproducing upon the subjacent portion of the register and the abstract sheets, the record made by writing upon the face of the memorandum of shipment sheet, and means for adjusting the several sheets in proper superposed relation.

13. A set of freight bill forms comprising a register sheet, having writing spaces and columns for the entry of appropriate data relating to a plurality of shipments, a memorandum of shipment sheet of smaller dimensions than the register sheet and having writing spaces and columns corresponding with some of the spaces and columns of the register sheet, means for adjusting the memorandum of shipment sheet in proper superposed relation upon the register sheet whereby in writing the data for a given shipment on the register sheet, the appropriate portion of said data may be simultaneously made upon the superposed sheet by a suitable transferring medium located between the two sheets.

14. A set of freight bill forms comprising an abstract sheet, having writing spaces and columns for the entry of appropriate data relating to a plurality of shipments, a memorandum of shipment sheet of smaller dimensions than the abstract sheet and having writing spaces and columns corresponding with some of the spaces and columns of the abstract sheet, means for adjusting the memorandum of shipment sheet in proper superposed relation upon the abstract sheet whereby in writing the data for a given shipment on the abstract sheet, the appropriate portion of said data may be simultaneously made upon the superposed sheet by a suitable transferring medium located between the two sheets.

15. A set of printed forms comprising a large register sheet, a narrower abstract sheet of the same length as and detachably united to the register sheet, means for transferring writing on the abstract to the subjacent register sheet when the two are in superposed relation, separate, duplicate freight bill sheets detachably secured together at their bottom edge and each containing vertically arranged columns adapted to register with each other and with some of the columns on the abstract sheet, and with some of the columns on the register sheet, a narrow strip of carbon or transferring material extending transversely across the reverse side of each freight bill sheet parallel with the bottom edge thereof, said register, abstract and freight bill sheets being adapted to be clamped or held together while being written upon to make a record upon one and the same horizontal line of each of said sheets, the freight bills removed and another set of freight bills clamped or held upon the abstract and register sheets in exact horizontal alinement with the next succeeding writing space thereon to make record upon the abstract and register sheets of a separate transaction.

In testimony that I claim the foregoing as my invention I affix my signature, in the presence of two witnesses, this 8th day of April, A. D. 1918.

WALTER D. BEYMER.

Witnesses:
TAYLOR E. BROWN,
BERTHA L. MACGREGOR.